United States Patent
Konchistky

(10) Patent No.: US 7,558,548 B2
(45) Date of Patent: Jul. 7, 2009

(54) METHOD AND APPARATUS FOR RECEIVING AND/OR DOWN CONVERTING HIGH FREQUENCY SIGNALS IN MULTI MODE/ MULTI BAND APPLICATIONS, USING MIXER AND SAMPLER

(76) Inventor: Alon Konchistky, 20488 Stevens Creek Blvd., Apt. 1402, Cupertino, CA (US) 95014

( * ) Notice: Subject to any disclaimer, the term of this patent is extended or adjusted under 35 U.S.C. 154(b) by 579 days.

(21) Appl. No.: 11/163,885

(22) Filed: Nov. 2, 2005

(65) Prior Publication Data
US 2007/0099588 A1  May 3, 2007

(51) Int. Cl.
*H04B 1/18* (2006.01)
(52) U.S. Cl. .................. 455/190.1; 455/325; 455/189.9; 455/196.1
(58) Field of Classification Search ............ 455/20, 455/118, 131, 190.1, 323, 313, 31, 325, 189.1, 455/196.1, 189.9
See application file for complete search history.

(56) References Cited

U.S. PATENT DOCUMENTS

| | | | |
|---|---|---|---|
| 5,375,146 A * | 12/1994 | Chalmers | 375/350 |
| 6,061,385 A * | 5/2000 | Ostman | 375/130 |
| 6,373,422 B1 * | 4/2002 | Mostafa | 341/155 |
| 6,603,806 B2 * | 8/2003 | Martone | 375/219 |
| 7,110,732 B2 * | 9/2006 | Mostafa et al. | 455/130 |
| 2002/0081988 A1 * | 6/2002 | Parker | 455/296 |
| 2004/0057534 A1 * | 3/2004 | Masenten et al. | 375/316 |
| 2007/0036247 A1 * | 2/2007 | Capretta et al. | 375/343 |
| 2007/0047669 A1 * | 3/2007 | Mak et al. | 375/316 |

* cited by examiner

*Primary Examiner*—Matthew D Anderson
*Assistant Examiner*—Erica Fleming-Hall
(74) *Attorney, Agent, or Firm*—Steven A. Nielsen; Allman & Neilsen, P.C.

(57) ABSTRACT

A method and apparatus to receive and down convert high frequency radio signals to low frequency or base band frequency is disclosed. A mixer used with a sampler produces a multi mode/multi band software enhanced radio receiver capable of supporting multiple air interfaces. The local oscillator of the disclosed mixer is harmonically related to the sampler frequency. A signal is first down converted by the mixer to a lower frequency or intermediate frequency, the signal is then sub sampled by the sub sampler, the signal is then converted to discrete time and all further processes are discrete. Successive decimation, filtering and demodulation in discrete or continuous time achieve selectivity and down conversion to base band.

19 Claims, 7 Drawing Sheets

METHOD AND APPARATUS FOR RECEIVING AND/OR DOWN CONVERTING HIGH FREQUENCY SIGNALS IN MULTI MODE/ MULTI BAND APPLICATIONS, USING MIXER AND SAMPLER

BACKGROUND OF THE INVENTION (1) Field of the Invention

The present invention relates to receiver circuits and methods of down converting RF (radio frequency) signals. The present invention also relates to means and methods of down converting RF signals by first converting a radio signal to an IF (intermediate frequency) with a mixer and sampling the signal with a discrete time mixer/sampler block.

(2) Description of the Related Art

Several methods of down converting RF signals are known in the related art, and include:
(1) Super-heterodyne conversion which uses one or more lower IF to eventually reach the base band.
(2) Direct Conversion which uses a LO (local oscillator) tuned at the center frequency of the desired radio channel to bring the RF signal directly to the base band.
(3) Direct Sampling which uses a sampler at a RF, a method equivalent to the use of a LO.
(4) Sub sampling which uses a sampler operating at relatively lower frequencies.

A block diagram of a typical super heterodyne receiver is shown in FIG. 1. An RF signal arriving at an antenna 25 passes through a band filter 100, a low noise amplifier (LNA) 101 and into an image filter (IMG FLT) 102 which produces a band-limited RF signal that enters a first mixer 103 which transforms the RF signal down to an intermediate frequency (IF) by mixing the RF signal with the signal created by the first local oscillator (LO) 200. The IF then passes through an IF filter 104 where unwanted mixer signals are removed. The signal then passes into an in phase quadrature sampler (I.Q.) 106. A second LO 201 sends a frequency signal to an I.Q. 106. An I.Q. 106 produces a baseband output in phase at 507b and quadrature out at 507c.

FIG. 2 is a block diagram of a direct sampling receiver, consider as prior art. FIGS. 1 and two are identical from antenna 25 to image filter 102. For the direct sampling receiver of FIG. 2, the output of IMG FLT 102 connects to a sampler 110. The output of a LO 200 connects to both a sampler 110 and a clock distribution 202.

The output of sampler 110 enters an input of a DTP/DSP 300. The output from a clock distribution 202 also enters an input of a DTP/DSP 300. The output of a DTP/DSP 300 is the baseband output at 507.

The related art fails to provide means or methods of further reducing the number of components used in RF down conversion.

There is a need in the art for means to reduce the number of IF filtering components while providing sufficient image and alias rejection.

The related art fails to provide support for the down conversion of several frequency bands by minimal modification to existing receiver circuits.

There is thus a need in the art for new receiver circuits and new methods of down conversion of RF signals that consume less power, produce less heat, and are more economical to manufacture.

BRIEF SUMMARY OF THE INVENTION (1) Advantages of the Present Invention

The present invention overcomes many short falls in the related art by providing extra alias rejection at the front end of the circuit, an advantage that the sub sampling architecture of the related art lacks.

The present invention provides image and alias rejection while significantly reducing the number of IF filtering components, an advantage not found in the related art.

The present invention overcomes a shortfall in the related art by eliminating the need for a second frequency source by use of a mixer/sampler clock frequency that is derived by division of the first LO frequency.

Unlike the related art, the present invention has the ability to support several RF bands with minimal hardware changes to existing devices.

(2) Summary of the Invention

The invention achieves new efficiencies in component size, reduces the number of components, and reduces the use of electricity and heat generation by use of a hybrid dual down conversion design where a radio signal is first converted to an intermediate frequency by use of a mixer and is then sampled by a discrete time sampler block. The local oscillator frequency of the first mixer and the clock frequency of the intermediate frequency sampler are harmonically related.

DETAILED DESCRIPTION OF THE INVENTION

Physical Attributes, Operation, and Methods

| Definition List 1 | |
|---|---|
| Term | Definition |
| RF | Radio Frequency |
| LO | Local Oscillator |
| Base Band | The desired signal range obtained after use of the disclosed invention. |
| IF | Intermediate Frequency |
| TX | Transmitter |
| VCO | Voltage Control Oscillator |
| FLT | Filter |
| DT | Discrete Time |

-continued

Definition List 1

| Term | Definition |
| --- | --- |
| Aliasing | An undesired folded signal |
| ADC | Analog to Digital Conversion |
| DAC | Digital to Analog Conversion |
| ANT | Antenna |
| LNA | Low Noise Amplifier |
| F | Frequency |
| fs | Sampling signal frequency |
| n | Integer |
| L | Integer |
| K | Integer |
| IQ | In phase and quadrature sampler |
| IMG FLT | Image filter |
| BAND FLT | Band filter |
| IF FLT | Intermediate frequency filter |
| CLK Distr. | Clock distribution |
| DTP/DSP Processor | Discrete time processor/discrete signal processor |
| DT Flt | Discrete time filter |

The present invention is described though several embodiments. The preferred embodiment is described in FIG. 5 which merely serves the purpose of facilitating the description of the principles of the present invention and in no way is meant to limit its scope. Those skilled in the art will realize that many changes and modification can readily be made to the preferred embodiment and alternative embodiments without departing from the principles of the invention.

FIG. 3

Figure 1:
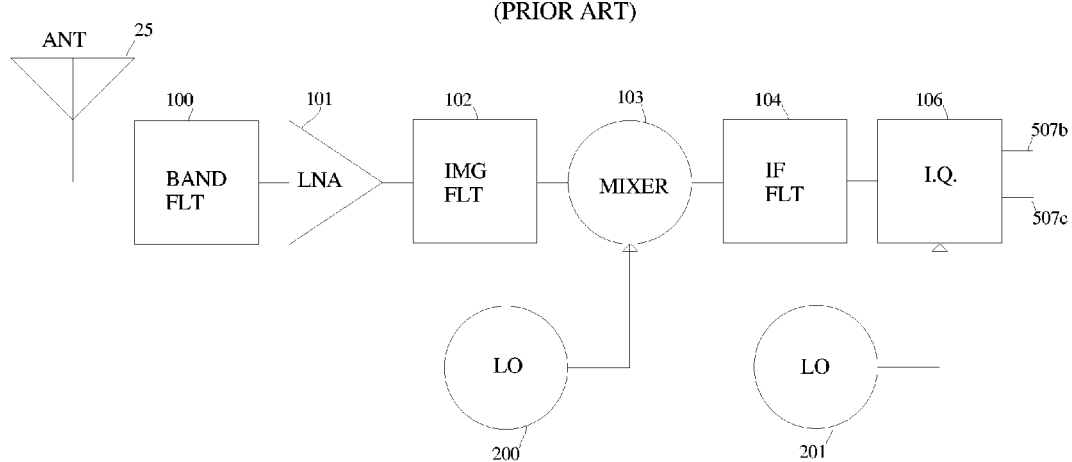
FIG. 1 is a block diagram of a super-heterodyne receiver considered as prior art.
Figure 2:
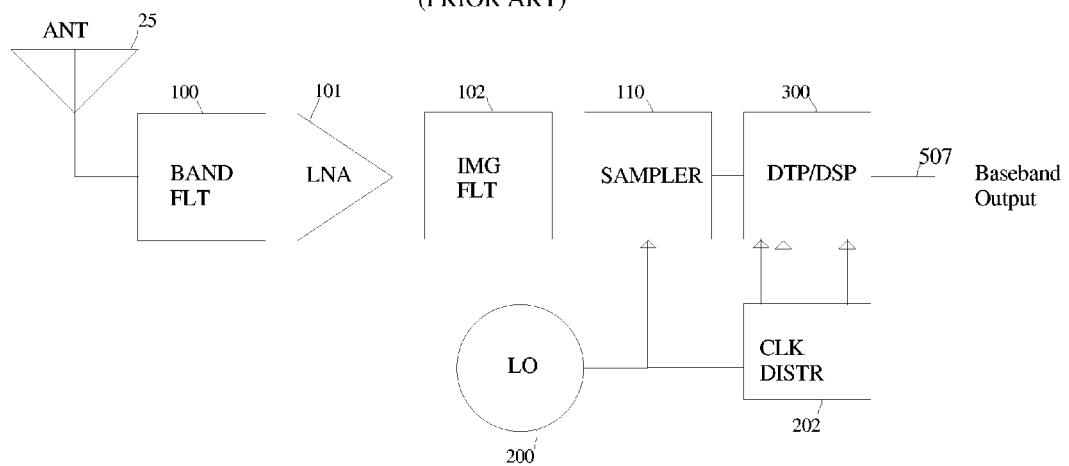
FIG. 2 is a block diagram of a direct sampling receiver considered as prior art.
Figure 3:
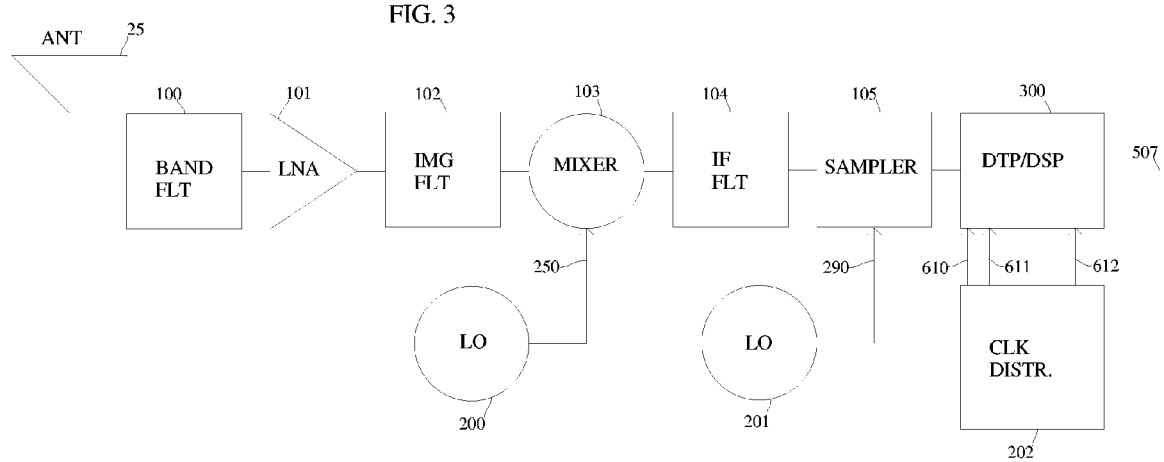
FIG. 3 is a block diagram of a method, in accordance with the present invention, to down convert high frequency signals to low frequency signals with a mixer and sampler and two separate local oscillators.

FIG. 3 is a block diagram of an RF receiver and down converter in accordance with the principles of the present invention. FIG. 3 discloses methods and means to down convert high frequency RF signals to low frequency signals with a mixer 103 and two local oscillators 200 and 201. High frequency signals enter an antenna 25 for coupling the signal into the input of a band filter 100. The output of band filter 100 connects to the input of a low noise amplifier (LNA) 101. The output of the LNA 101 connects to the input of image filter 102.

The output of image filter 102 connects to the input of mixer 103. Through connection 250, the output of the first local oscillator 200 connects to an input to mixer 103. The output of mixer 103 connects to an input of intermediate frequency (IF) filter 104. The output of IF filter 104 connects to the input of sampler 105. The second local oscillator 201 connects via 290 to an input of sampler 105 and to the input of the clock distribution 202.

The output of sampler 105 connects to an input of discrete time process/discrete signal processor (DTP/DSP) 300. Clock distribution block 202 sends output through lines 610, 611, and 612 into an input of DTP/DSP 300. The output of DTP/DSP 300 exits at connection 507 as baseband output.

FIG. 4

Figure 4:
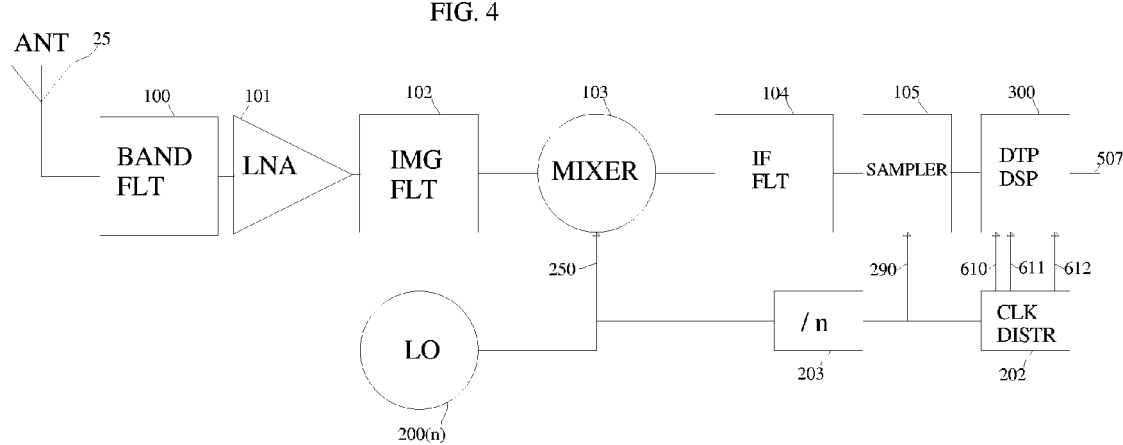
FIG. 4 is a block diagram of a method, in accordance with the present invention, to down convert high frequency signals to low frequency signals with a mixer, sampler and one local oscillator.

FIG. 4 is a block diagram of the present invention using just one local oscillator 200(n) to produce input to mixer 103. The LO 200(n) signal is divided by n and then utilized by sampler 105 and clock distribution 202. The value of n is supplied by the clock distribution 202.

From antenna 25 to image filter 102, the physical structure and methods of the receivers in FIGS. 3 and 4 are identical. In FIG. 4, the output of image filter 102 connects to an input of mixer 103. Local oscillator 200(n) connects to an input to mixer 103 through connection 250.

The frequency of LO 200(n) is divided by n from variable divider 203. The value of n used by variable divider 203 is obtained from clock distribution 202.

An output from local oscillator 200(n) is connected via connection 290 to sampler 105. Clock distribution 202 and LO 200(n) are connected.

The output from mixer 103 connects to the input of IF filter 104. The output of IF filter 104 connects to an input of sampler 105. The output of sampler 105 connects to the input of DTP/DSP processor 300.

The output of Clock distribution 202 travels through connections 610, 611, and 612 into DTP/DSP processor 300. The output of DTP/DSP processor 300 travels through wire 507 and is low intermediate frequency output. A more detailed view of the clock distribution 202 and DTP/DSP processor 300 is found in FIG. 6, where the cascading format of the DTP/DSP processor is displayed.

FIG. 5

Figure 5:
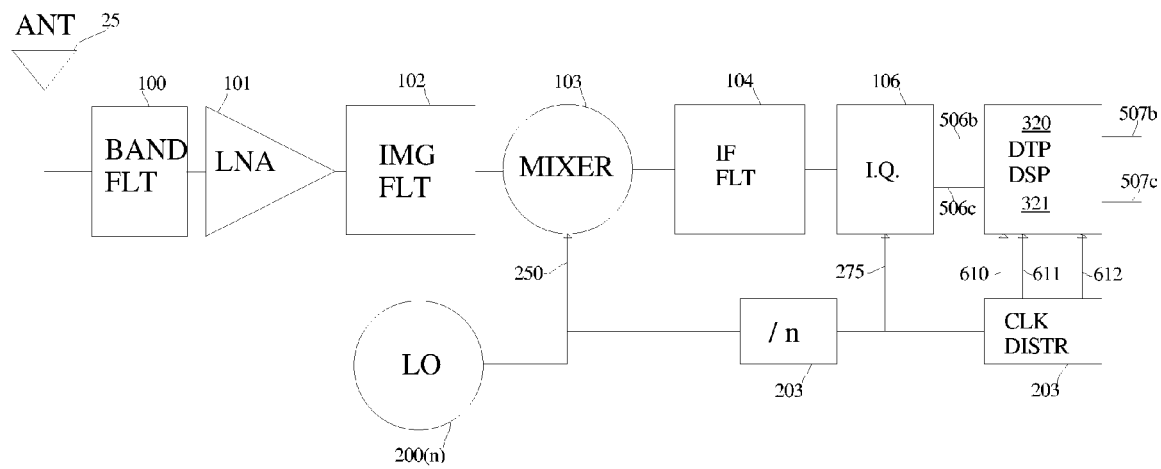
FIG. 5 is a block diagram of a method, in accordance with the present invention, to down convert high frequency signals to low frequency signals with an in phase quadrature sampler (I.Q.), a LO, a mixer, a clock distribution and a DTP/DSP processor.

FIGS. 4 and 5 are identical to the point of IF FLT 104. The output of IF FLT 104 enters the input of I.Q. 106. The output of LO 200(n) is divided by n from divider function 203. The value of n is obtained from clock distribution 203. After division by n of 203, the output of LO 200(n) travels through connection 275 to enter an input of I.Q. 106.

The two outputs of I.Q. 106 enter DTP/DSP blocks 320 and 321. Clock distribution 203 sends outputs at 610, 611, and 612 to DTP/DSP blocks 320 and 321 as more particularly illustrated in FIG. 7. The 320 portion of DTP/DSP processor produces baseband output in phase at 507b. The 321 portion of DTP/DSP processor produces baseband quadrature output at 507c.

FIG. 6

Figure 6:
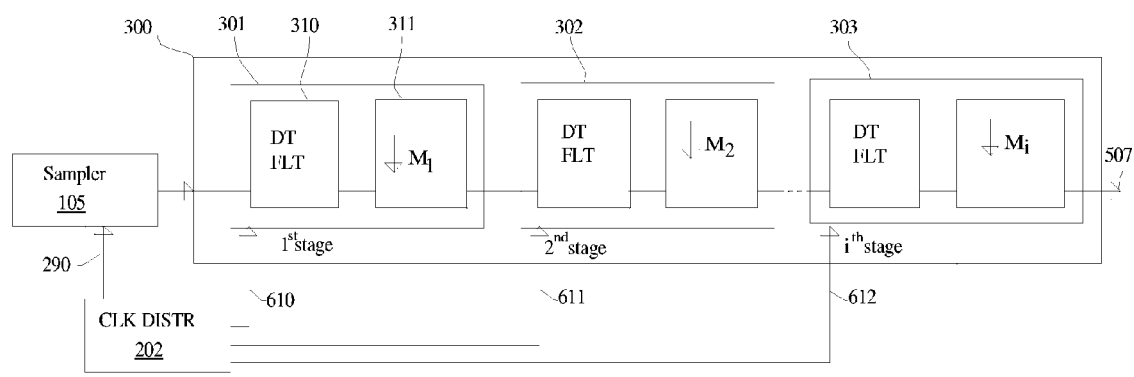
FIG. 6 is a block diagram of a detailed view of a DTP/DSP Processor in accordance with the present invention.

FIG. 6 is a detailed block diagram of the DTP/DSP processor 300 and clock distribution 202 of FIG. 4. The clock distribution provides input to each of the blocks 301, 302, and 303 or $i^{th}$ blocks. The 301, 302, and 303 blocks comprise a discrete time filter (DT FLT) 310 and a decimation block ($M_1$) 311. The 301, 302, and 303 blocks may be cascading, are connected to one another, and each receive input 610, 611, and 612, respectively, from the clock distribution.

FIG. 7

Figure 7:
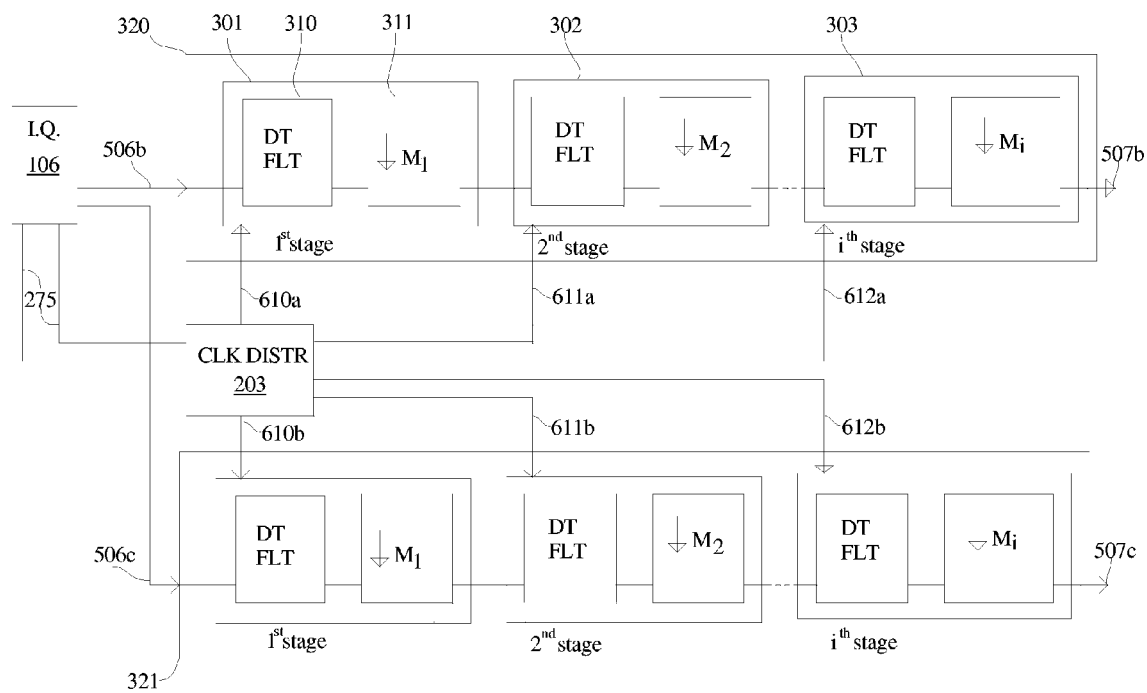
FIG. 7 is a block diagram of a detailed view of a clock distribution and clock interaction with the discrete-time signal processing block in accordance with the present invention.

FIG. 7 is a detailed block diagram of the DTP/DSP 320 and 321 blocks and clock distribution 203 of FIG. 5. The I.Q. 106 provides output at 506b and 506c to cascading blocks such as 301 comprising a discrete time filter (DT FLT) 310 and a decimation block ($M_1$) 311. The clock distribution 203 sends two output signals through connections 275 to I.Q. 106.

The clock distribution sends signals via 610a, 611a, and 612a to cascading DT Filter/$M_↓$ blocks 301, 302, and 303 respectively. There are two parallel strings 320 and 321 of cascading DT Filter/$M_↓$ blocks. The second string 321 of cascading DT Filter/$M_↓$ blocks receives timing signals through 610b, 611b, and 612b. The final baseband outputs of cascading blocks 320 and 321 are sent to 507b and 507c respectively. The $M_↓$ blocks are decimation blocks which decimate every $M^{th}$ sample.

FIG. 8

Figure 8:
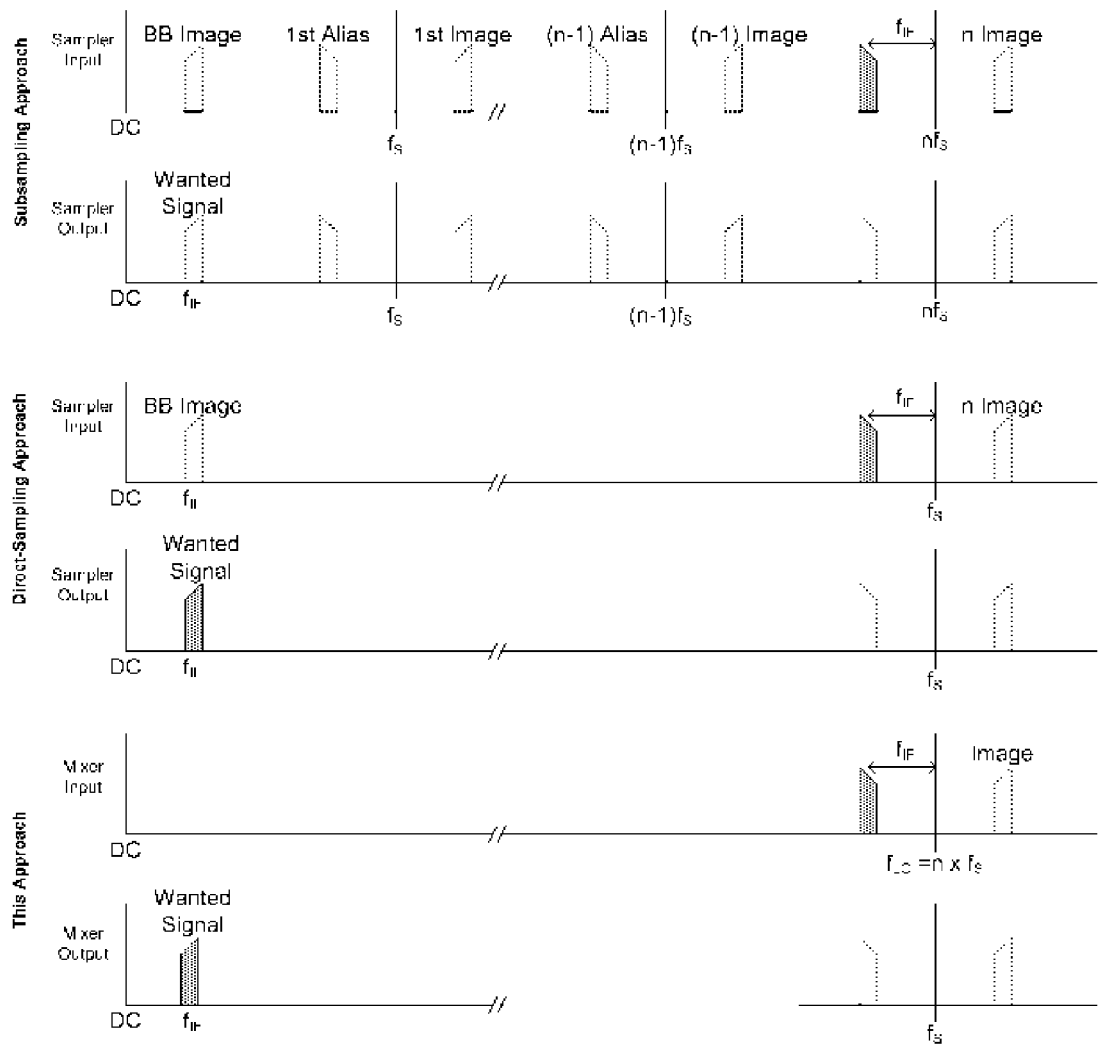
FIG. 8 is a signal path in the spectrum or frequency domain for the present invention with general n.

FIG. 8 a signal path in the spectrum or frequency domain for the present invention with general n. The vertical axis denotes amplitude and the horizontal axis denotes frequency.

FIG. 9

Figure 9:
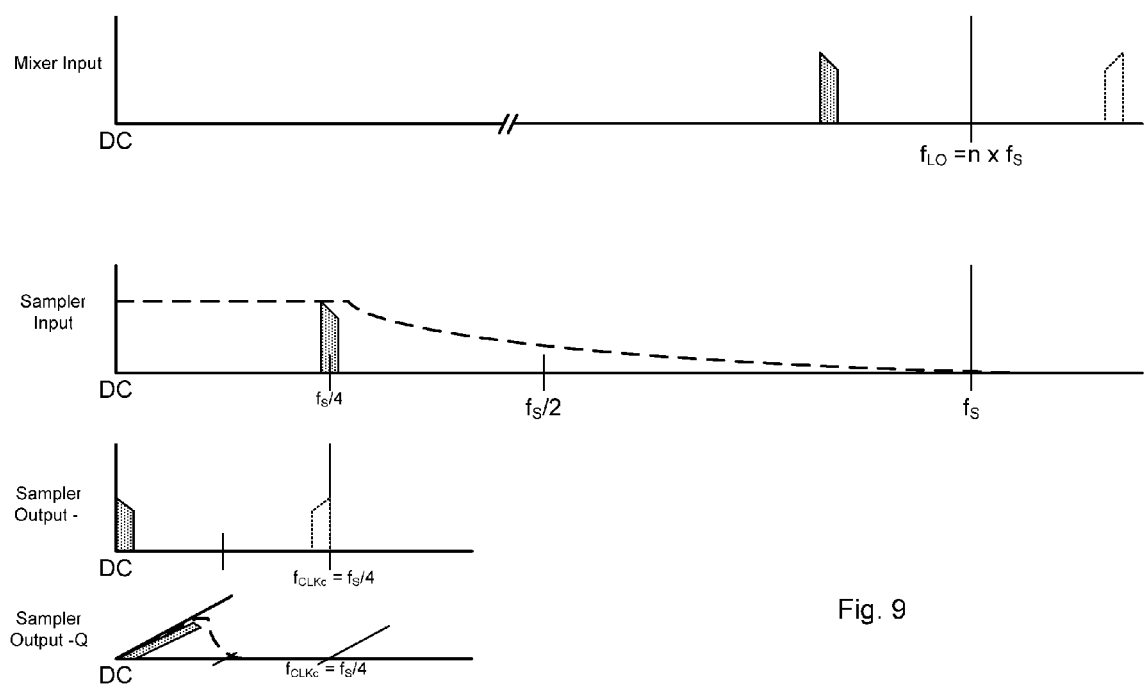
FIG. 9 is a signal path in the spectrum or frequency domain for the present invention with n=3.

FIG. 9 is a signal path in the spectrum or frequency domain for the present invention with n=3. The vertical axis denotes amplitude, and the horizontal axis denotes frequency.

Figure 10:
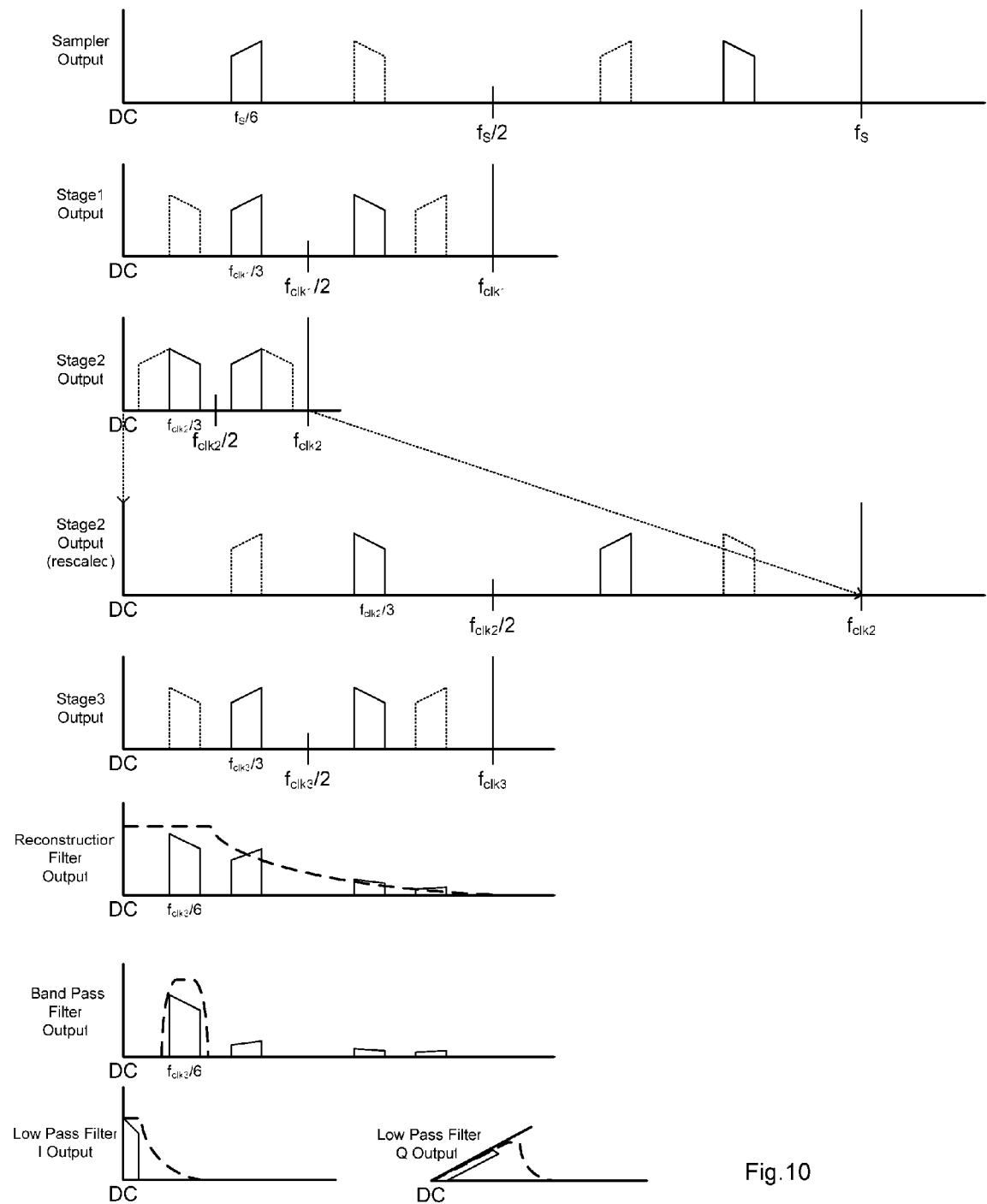
FIG. 10 is a signal path in the spectrum or frequency domain for the present invention with n=4.

FIG. 10 is a signal path in the spectrum or frequency domain for the present invention with n=4. The vertical axis denotes amplitude, and the horizontal axis denotes frequency.

Further Advantages and Details

As shown in the included drawings, at the mixer/sampler block the signals may be processed in discrete time at a lower clock rate than a direct sampling approach would require. The disclosed invention offers two main approaches for further signal processing;

1. A quadrature mixing/sampling design in which the mixer/sampler is operating with 90 degree offset time clocks. Two separate real signal paths are used with this approach. Low Pass (instead of band pass) discrete-time or continuous time filters may be used. Depending upon the placement of the IF, the output of this cascade may be located either Base Band or at a low IF.
2. A cascade of discrete time stages each features a filter/decimator. By optimizing the filtering and decimation functionality, each successive stage may operate in progressively lower clock frequencies, conserving power. If desired, at some point in the cascade a quadrature demodulator may be used to convert the signal to Base Band is a similar manner as described in approach 1 above.

This invention discloses a method and apparatus for down converting high frequency FR signals to base band though the use of a hybrid mixer/sampler with the following variations:

1. A mixer may operate at the same rate as the mixer/sampler (n=1) while subsequent decimation brings the processing clock down by the decimation ratio.
2. The IF placement is close but not at fS/4. By using this option a very-low-IF (VLIF) complex conversion may be employed. This alternative will address various impairments such as 1/f device noise, $2^{nd}$ order intermodulation effects and DC offsets.
3. The mixer/sampler may be replaced by a continuous time mixer. This results in a complete continuous time domain solution in which the RF mixer and the IF mixer LOs are related pursuant to the principles of the disclosed invention.

The principles of the invention include the following items:

Item 1: A circuit comprising means of down converting high RF signals to base band by means of a hybrid mixer/sampler wherein the mixer uses a LO frequency related to the sampling frequency by an integer.

Item 2: The circuit of item 1 wherein the integer is n and (fLO=n*fS) and the mixer/sampler sampling frequency is a multiple of the desired IF signal center frequency such that fs=L*fIF, for a high-side LO injection, the sampling frequency is (fS=L*(fLO−fRF)=L/(L*n−1)*fRF), and for a low-side LO injection the sampling frequency is (fS=L/(L*n+1) *fRF).

Item 3: The circuit of item 2 where L=3 or L=4.

Item 4: The circuit of item 2 used as a receiver circuit receiving a transmission frequency band which is lower than the receiver band and a low-pass filter is used to reject transmitter self interference and wherein the transmission frequency band is above the receiver band a low-side LO is used to reject transmitter self interference.

Item 5: The circuit of item 4 wherein L=3 and a sampler/filter/decimation combination is used to down convert the signal to a lower IF by means allowing an integrated filter to be used.

Item 6: The circuit of item 4 wherein L=4 and a quadrature down conversion/filtering/decimation combination circuit is used for further signal processing at the base band.

Item 7: The circuit of item 4 wherein L =6.

Item 8: The circuit of item 4 wherein the k and n divider ratios and LO injection side are optimized to allow the use of a relatively narrow range (10 Mhz to 100 Mhz) VCO.

Item 9: The circuit of item 4 the L divider may be a non-integer but a rational number, such that (L =L1/L2=fS/fIF, and 1<L<2) allowing sub-sampling of the signal.

Item 10: The circuit of item 4 wherein the n divider may be a non-integer but rational number.

Item 11: The circuit of item 4 wherein a sub sampler is substituted for the sampler/mixer by means allowing the IF signal to be sub sampled.

Item 12: The circuit of item 4 wherein the IF is in the range of fS/5 to fS/6.

Item 13: The circuit of item 4 wherein the sampler is replaced by a continuous time mixer.

Item 14: A method for down converting high frequency FR signals to base band through the use of a hybrid mixer/sampler where the mixer LO frequency is related to the sampling frequency by an integer (fLO=n* fS), and the mixer/sampler sampling frequency is placed at a multiple of the desired IF signal center frequency; for a high-side LO injection, the sampling frequency is (fS=L*(fLO−fRF)=L/(L*n−1)*fRF), and for a low-side LO injection ,the sampling frequency is (fS=L/(L*n+1) *fRF).

Item 15: The method of item 14 where L=3 or L=4 and where in a typical mobile communications handset receiver where the mobile TX frequency band is placed below the receiver band, a High-side LO is utilized such that the transmitter self-interference may be rejected by means of an interference low-pass filter and in applications where the converse configuration is given, such as base stations or other wireless systems, a low-side LO is used.

Item 16: The method of item 15 wherein L=3 and a sampler/filter/decimation combination is used to down convert the signal to a lower IF.

Item 17: The method of item 15 where L=4 and a quadrature down conversion /filtering/decimation scheme is used for further signal processing at the base band.

Item 18: The method of item 16 wherein L=6, enabling extra low-pass filtering while also using the same decimation plan, enabling the receiver to operate in additional bands or with additional interference rejection if needed.

Item 19: The method of item 14 wherein the L divider is a non-integer but rational number (L=L1/L2=fS/fIF, and 1<L<2) allowing the signal to be sub-sampled.

Item 20: The method of item 14 wherein a sub sampler is used instead of a sampler/mixer, and the IF signal is sub-sampled, and sufficient image and alias rejection are provided by replacing the IF low pass filter by a selective bandpass filter.

What is claimed is:

1. A circuit comprising means of down converting high RF signals to base band by means of a hybrid mixer/sampler wherein the mixer uses a LO frequency related to the sampling frequency by an integer and wherein the integer is n and (fLO=n*fS) and the mixer/sampler sampling frequency is a multiple of the desired IF signal center frequency such that fs=L* fIF, for a high-side LO injection, the sampling frequency is (fS=L*(fLO−fRF)=L/(L*n−1)*fRF), and for a low-side LO injection the sampling frequency is (fS=L/(L*n+1)*fRF.

2. The circuit of claim 1 where L=3 or L=4.

3. The circuit of claim 1 used as a receiver circuit receiving a transmission frequency band which is lower than the receiver band and a low-pass filter is used to reject transmitter self interference and wherein the transmission frequency band is above the receiver band a low-side LO is used to reject transmitter self interference.

4. The circuit of claim 3 wherein L=3 and a sampler/filter/decimation combination is used to down convert the signal to a lower IF by means allowing an integrated filter to be used.

5. The circuit of claim 3 wherein L=4 and a quadrature down conversion/filtering/decimation combination circuit is used for further signal processing at the base band.

6. The circuit of claim 3 wherein L=6.

7. The circuit of claim 3 wherein the k and n divider ratios and LO injection side are optimized to allow the use of a relatively narrow range (10 Mhz to 100 Mhz) VCO.

8. The circuit of claim 3 the L divider may be a non-integer but a rational number, such that (L=L1/L2=fS/fIF, and 1<L<2) allowing sub-sampling of the signal.

9. The circuit of claim 3 wherein the n divider may be a non-integer but rational number.

10. The circuit of claim 3 wherein a sub sampler is substituted for the sampler/mixer by means allowing the IF signal to be sub sampled.

11. The circuit of claim 3 wherein the IF is in the range of fS/5 to fS/6.

12. The circuit of claim 3 wherein the sampler is replaced by a continuous time mixer.

13. A method for down converting high frequency FR signals to base band through the use of a hybrid mixer/sampler where the mixer LO frequency is related to the sampling frequency by an integer (fLO=n*fS), and the mixer/sampler sampling frequency is placed at a multiple of the desired IF signal center frequency; for a high-side LO injection, the sampling frequency is (fS=L*(fLO−fRF)=L/(L*n−1)*fRF), and for a low-side LO injection ,the sampling frequency is (fS=L/(L*n+1)*fRF).

14. The method of claim 13 where L=3 or L=4 and where in a typical mobile communications handset receiver where the mobile TX frequency band is placed below the receiver band, a High-side LO is utilized such that the transmitter self-interference may be rejected by means of an interference low-pass filter and in applications where the converse configuration is given, such as base stations or other wireless systems, a low-side LO is used.

15. The method of claim 14 wherein L=3 and a sampler/filter/decimation combination is used to down convert the signal to a lower IF.

16. The method of claim 14 where L=4 and a quadrature down conversion /filtering/decimation scheme is used for further signal processing at the base band.

17. The method of claim 15 wherein L=6, enabling extra low-pass filtering while also using the same decimation plan, enabling the receiver to operate in additional bands or with additional interference rejection if needed.

18. The method of claim 13 wherein the L divider is a non-integer but rational number (L=L1/L2=fS/fIF, and 1<L<2) allowing the signal to be sub-sampled.

19. The method of claim 13 wherein a sub sampler is used instead of a sampler/mixer, and the IF signal is sub-sampled, and sufficient image and alias rejection are provided by replacing the IF low pass filter by a selective band-pass filter.

* * * * *